US005307092A

United States Patent [19]

Larson

[11] Patent Number: 5,307,092

[45] Date of Patent: Apr. 26, 1994

[54] IMAGE FORMING DEVICE

[75] Inventor: Ove Larson, Västra Frölunda, Sweden

[73] Assignee: Array Printers AB, Sweden

[21] Appl. No.: 842,357

[22] PCT Filed: Sep. 25, 1990

[86] PCT No.: PCT/SE90/00611

§ 371 Date: Mar. 25, 1992

§ 102(e) Date: Mar. 25, 1992

[87] PCT Pub. No.: WO91/04863

PCT Pub. Date: Apr. 18, 1991

[30] Foreign Application Priority Data

Sep. 26, 1989 [SE] Sweden .............................. 8903617-8

[51] Int. Cl.[5] .............................. G01D 15/06

[52] U.S. Cl. .............................. 346/154

[58] Field of Search .............................. 346/154, 160.1

[56] References Cited

U.S. PATENT DOCUMENTS 4,755,837 7/1988 Schmidlin et al. ........... 346/160.1 X 4,912,489 3/1990 Schmidlin ........................... 346/159

5,036,341 7/1991 Larsson .............................. 346/154

*Primary Examiner*—George H. Miller, Jr.

*Attorney, Agent, or Firm*—Ostrolenk, Faber, Gerb & Soffen

[57] ABSTRACT

An image-forming device for an electrographic printer, in which a latent electrical charge pattern of electrical signals is produced in an electrode unit having an electrode matrix situated between a particle carrier and a backing electrode. The matrix comprises a screen or grid of electrodes and a plurality of apertures. The apertures are partly opened and closed electrostatically for the controlled transmission of pigment particles of toner to an information carrier (e.g., paper). The electrodes and other surfaces of the device which are contacted by the pigment particles are provided with a layer of antistatic coating of an electrically conductive or semiconductive material. Tribo friction charges which are produced between the pigment particles and the electrodes and other surfaces are transported by the antistatic coating to a control unit which is connected to ground and which conducts the tribo charges from the device.

15 Claims, 4 Drawing Sheets

FIG. 7A
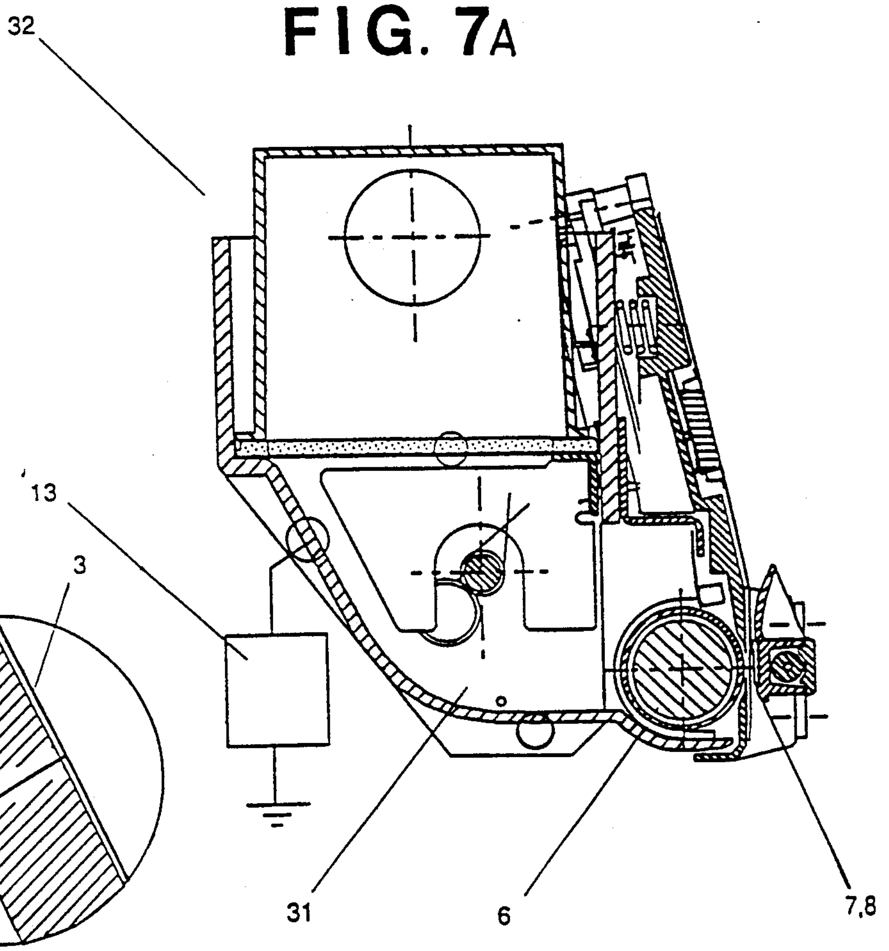
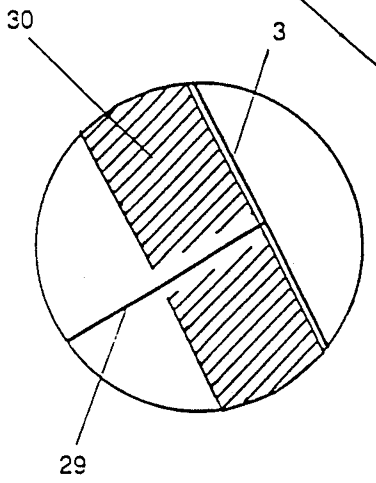
FIG. 7B

IMAGE FORMING DEVICE

BACKGROUND OF THE INVENTION

1. Field of the Invention

The invention refers to an image forming device in printers of the type which comprise an electrode unit, including a screen or grid of electrodes and a plurality of apertures or passages between the electrodes, situated between at least a particle carrier and a backing electrode, whereby the passages are partly opened and closed electrostatically for the controlled transition of the pigment particles through the electrode unit.

2. Description of the Prior Art

Swedish Patent No. 8704883-1 (PCT-SE88-00653) discloses a method for developing pictures and text with pigment particles on an information carrier, directly from computer generated electric signals, without the need for these signals to be intermediately stored for temporary conversion to light energy, which is the case in the photo-conductive printers, e.g., laser printers.

These problems have been solved by bringing the information carrier into electrical cooperation with at least a screen or a grid-shaped matrix, preferably an electrode matrix, which, through control in accordance with the configuration of the desired pattern, at least partly opens and closes passages through the matrix, which is galvanically connected to a voltage source. An electric field is thus exposed through the opened passages for the attraction of the pigment particles of the toner towards the information carrier.

In this method, herein referred to as the EMS-concept, the pigment is produced by the pigment particles passing through the openings or passages in the electrode matrix. Thus, the pigment particles can touch parts of the electrode matrix during the developing process. This physical contact between the pigment particles and the isolating surface layer of the electrode matrix or other non-conducting parts of the printer device gradually can give rise to tribo (friction) charges. These charges change the electric field so that the dots produced on the information carrier (e.g., the paper) are negatively affected in shape, size, blackness and definition. Further tribo charges may cause attraction forces between the pigment particles and other parts of the printer device, so that passages are plugged as a result of the increased quantity of attracted pigment particles.

It has also been observed that electric fields can attract pigment particles in areas adjacent the passages, so that developed dots on a paper can emit pigment particles onto non-desired surfaces and other parts of the device.

In the other methods, described, for example, in GB 2108432, the pigment particles touch nonconducting parts of the device, which control the electric field pattern between the information carrier and the pigment particles, and printing quality is affected and degraded by the above-mentioned tribo charges.

SUMMARY OF THE INVENTION

The present invention overcomes the above deficiencies of the prior art by providing a device which diminishes the tendency of spark-over, and which can redistribute, drain or remove the above-mentioned tribo charges from the electrode matrix and other parts, the charge of which negatively affects the quality of printing.

These objects have been achieved by coating, surrounding, or making the electrodes and/or other surfaces of the device which come into contact with the pigment particles with an electrical conducting or semiconducting antistatic coating material which, by means of a device, is intermittently or continuously connectable to ground in order to conduct away the tribo charges.

This type of device gives EMS and other electrographic concepts high quality prints with good readability, even in circumstances when the device operates continuously without maintenance and service.

BRIEF DESCRIPTION OF THE DRAWINGS

The invention will be described in greater detail below with reference to the accompanying drawings, which show the different embodiments.

FIG. 7 shows a cross-section of a printer device according to the EMS-concept, with an encircled cut of a wall in the printer device shown in enlargement.

DESCRIPTION OF THE PREFERRED EMBODIMENTS

Figure 1:
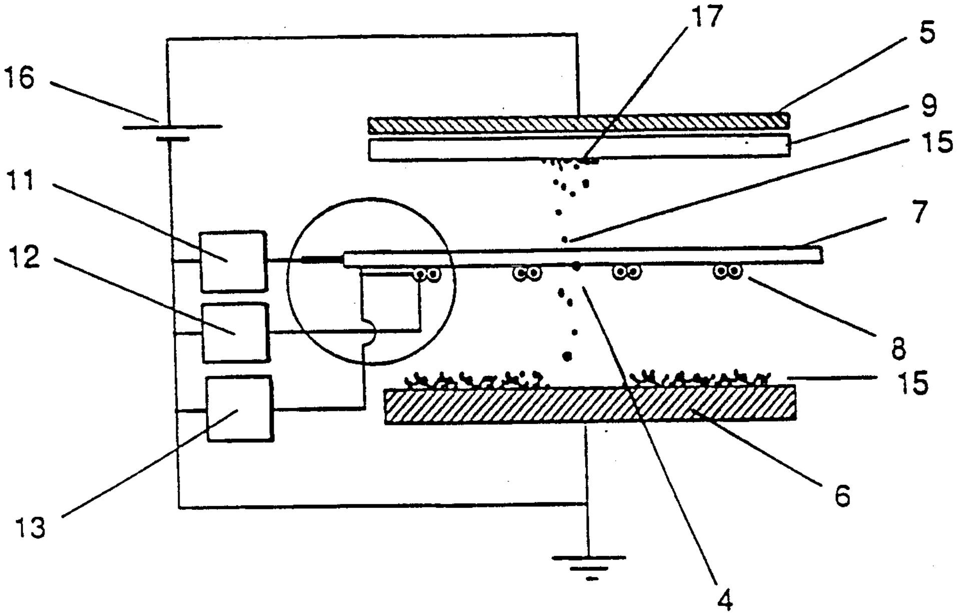
FIG. 1 diagrammatically shows a device according to the invention applied with the EMS-concept.

When using direct developing devices for printers, where pigment particles 15 of a toner fed from a grounded roller 6 pass through apertures 4, 27 of an electrode matrix to an information carrier 9 (paper), disposed on a backing electrode 5, which attracts the pigment particles, the potential of which is provided by a voltage source 16, the probability of physical contact between the pigment particles 15 and the isolating surface layer 2, 28 is large. This is shown diagrammatically in FIGS. 1 and 6. Since a large number of charged particles 15 are demanded for developing every separate dot 17 on the information carrier 9, tribo charges 10 are gradually supplied to the device. A saturation of tribo charges in certain cases have been verified after about one hundred pages. These charges 10 will affect the rest of the potentials of the device and thereby affect the appearance of the dot 17.

Figure 2:
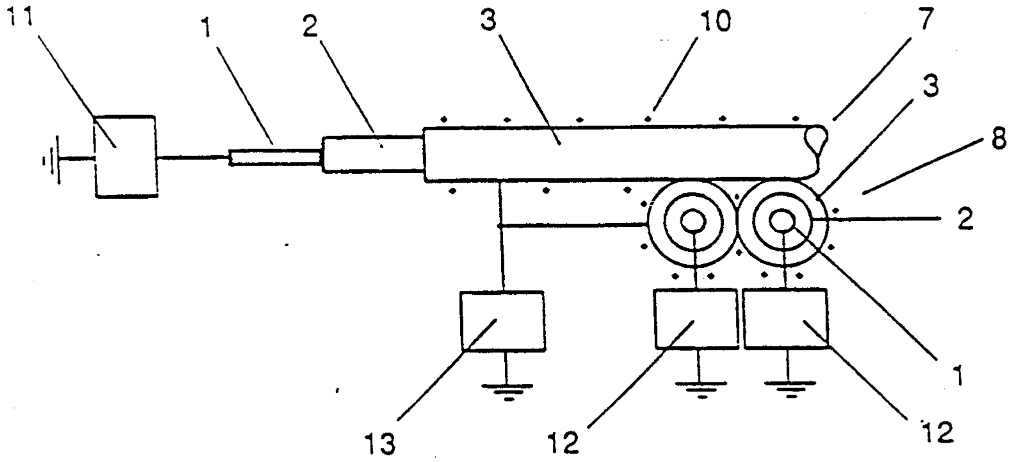
FIG. 2 shows an enlarged cross-section of the electrode matrix of FIG. 1.

In FIG. 2 there is shown an outer semiconducting or fully conducting surface layer of an electrode referred to as an antistatic layer 3, which is applied on the isolating layer 2 disposed around a center conductor 1. The layer 3 is also applied to transversal electrodes 8, having an extension which is transversal to the direction of movement of the paper, and printing electrodes 7, having an extension which is essentially parallel to the direction of movement of the paper, which are connected to ground or another potential level common for the system via a device 13 which removes the tribo charges. A control unit 12 provides transversal electrodes 8 with suitable potentials, and control unit 11 provides potentials for printing electrodes 7. The antistatic layer 3 through its wholly or partly conducting ability can transport the charges 10 to the device 13. The antistatic layer 3 is galvanically separated from the center conductors 1 by isolating layer 2. The antistatic layer 3 is preferably a volume resistive semiconducting material, but for certain applications the layer can be constituted by an antistatic agent, e.g., a hydroscopic liquid, film or the like.

Figure 3:
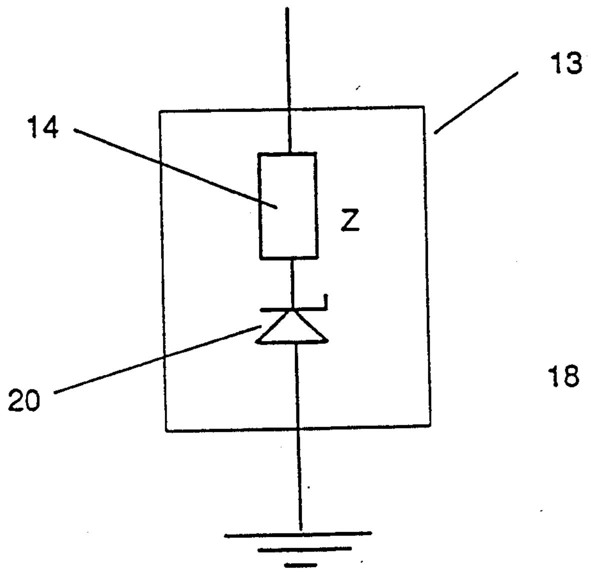
FIG. 3 shows a device for removing tribo charges with nonlinear impedance for continuous connection of the antistatic layer to ground.
Figure 4:
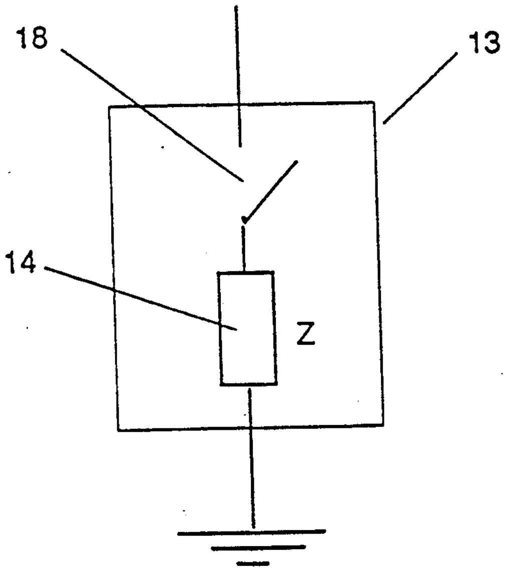
FIG. 4 shows a device for removing tribo charges with an impedance for the intermittent connection of the antistatic layer to ground.
Figure 5:
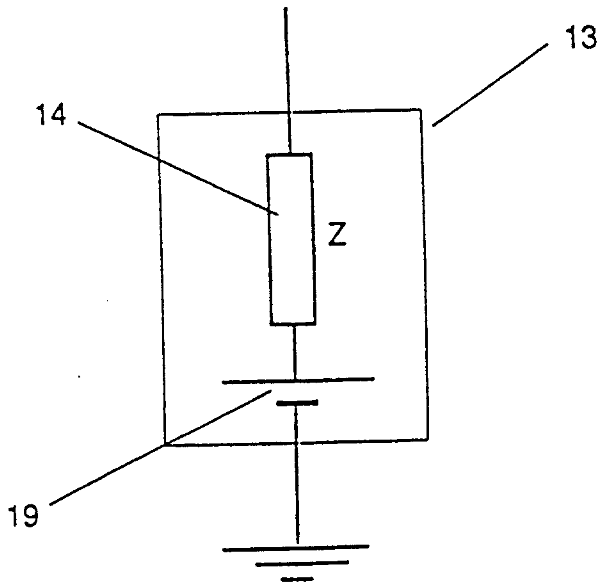
FIG. 5 shows a device for removing tribo charges with a voltage source and an impedance for the continuous connection of the antistatic layer to ground.

FIGS. 3, 4 and 5 show different embodiments of tribo charge removal device 13. FIG. 3 shows a device for the continuous drainage of charges 10 through an impedance 14 or Z, which can be nonlinear, and a zener diode 20, which is capable of limiting or in another way controlling the characteristics of the drained voltage. The impedance 14, which can be a resistor, preferably of high resistance, is adapted so that the drainage of the charges will be optimum with respect to the intended function of the electrode matrix. The zener diode 20 can be used to limit the potential of the antistatic layer 3, whereby the building up of the potential of the antistatic layer may take place more rapidly.

FIG. 4 shows another variant of the device 13 for the intermittent drainage of charges 10. The switch 18 galvanically connects the antistatic layer 3 with the device 13 and can be closed, e.g., between the printing of two pages, whereby the drainage through the impedance 14 can take place without disturbing the developing process.

FIG. 5 illustrates a voltage source 19, which provides the antistatic layer 3 with suitable potentials, can be a DC, AC or other pulsating voltage, connected in series with the impedance 14. By optimizing the potential level of the voltage source 19, to which the antistatic layer is connected via impedance 14, the building up of the potential of the antistatic layer 3 is minimized, as well as the amount of pigment particles which pass through the passages or apertures 4, 27.

Figure 6:
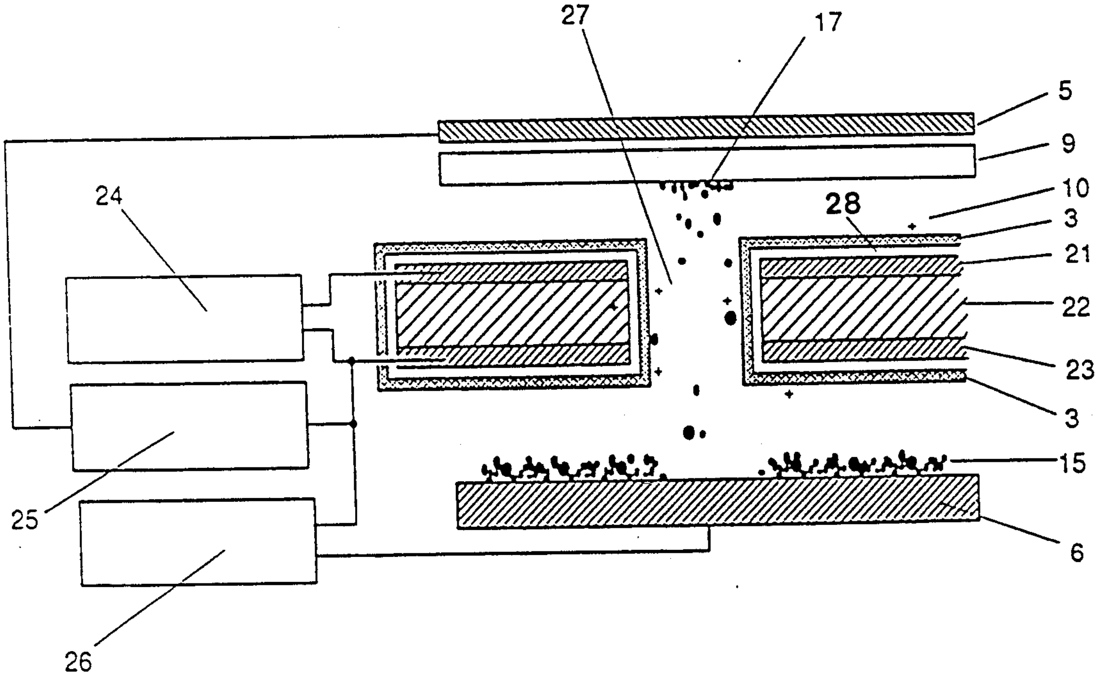
FIG. 6 diagrammatically shows a device according to the present invention applied with a further variant of a printer concept.

A further embodiment according to the invention is shown in FIG. 6, where the antistatic layer 3 is allowed to electrically float. That is, the antistatic layer 3 has no connection either directly or indirectly to ground or any other potential level. The antistatic layer 3 is galvanically separated from the signal electrodes 21 surrounding the passage or aperture 28 and disposed between the particle carrier of developer 15 and the information carrier (paper) 9, and the base electrode 23 via an isolating layer 28. An isolator 22 is disposed between the signal electrodes 21 and base electrode 23. Control unit or other voltage source 24 provides signal electrodes 21 with suitable potentials and control unit or voltage source 25 provides base electrode 23 with the suitable potential. The voltage source or other control device 26 provides developer roller 6 with a suitable voltage and can be a pulsating or alternating voltage. The tribo charges 10 can be distributed in the antistatic layer 3, so that an insignificant, or no, influence on the form, size, definition and blackness of the dots occurs. It is important to drain the tribo charges from other surfaces and components of the device, e.g., the backing electrode 5 belonging to the electrode matrix, the potential of which might have an influence on the printing quality. This influence can take place either directly by the presence of charges in the vicinity of the development process which influences the field pattern in the passages of the electrode matrix or by the charge of the pigment particles being influenced and changed by tribo charging of the nonconducting parts of the device, e.g., the container holding the pigment particles.

An embodiment for the drainage of tribo charges applied on a printer which operates according to the EMS-concept is shown in FIG. 7. A wall 30 of the container 31, which contains the pigment particles, is normally made of a nonconducting polymer material. By coating the inside of the container and/or other parts in the printer device 32 with a semiconducting or conducting antistatic layer 3 connected via cable 29 to device 13, an undesirable charging of the container and/or the pigment particles can be avoided. It is also possible to make the walls 30 of the container of a semiconducting or conducting material and connect this via the device 13 to ground.

The invention is not limited to embodiments described herein. Thus, it is possible to combine the different embodiments into new solutions not described herein. Nor is the applicability of the invention limited to printer concepts which have been shown herein, but may be applied to all types of printer methods where tribo charging of the vital members of the printer negatively affect the printing quality.

What is claimed is:

1. An image forming device for an electrographical printer, having an electrode unit which comprises a screen or grid of electrodes with a plurality of apertures, wherein the aperture electrostatically control transmission of pigment particles to an information carrier, comprising:

antistatic coating material at surfaces of the device which are contacted by said pigment particles, wherein the electrodes are coated by said antistatic coating material, said antistatic coating material being galvanically separated from the electrodes by an isolation layer; and means for removing tribo friction charges which are produced between said pigment particles and said surfaces, wherein said antistatic coating material transports said tribo charges to said removing means.

2. The image forming device of claim 1, wherein said removing means can be intermittently connected to ground to conduct away said tribo charges.

3. The image forming device of claim 1, wherein said removing means can be continuously connected to ground to conduct away said tribo charges.

4. The image forming device of claim 1, wherein said antistatic coating material comprises an electrically conductive material.

5. The image forming device of claim 1, wherein said antistatic coating material comprises an electrically semiconductive material.

6. The image forming device of claim 1, wherein said isolation layer comprises an insulation layer.

7. The image forming device of claim 1, wherein said isolation layer comprises a layer of air.

8. The image forming device of claim 1, wherein said removing means comprises a switch connected to an impedance.

9. The image forming device of claim 1, wherein said pigment particles are held in a container and the inside of said container has a layer of said antistatic coating material.

10. The image forming device of claim 9, wherein said container is made of an electrically conductive material.

11. The image forming device of claim 9, wherein said container is made of an electrically semiconductive material.

12. The image forming device of claim 1, wherein said removing means comprises a control unit.

13. The image forming device of claim 1, wherein said removing means comprises a high resistance resistor and a zener diode.

14. An image forming device for an electrographical printer, having an electrode unit which comprises a screen or grid of electrodes with a plurality of apertures, wherein the apertures electrostatically control transmission of pigment particles to an information carrier, comprising:

antistatic coating material at surfaces of the device which are contacted by said pigment particles; and means for moving tribo friction charges which are produced between said pigment particles and said surfaces, said removing means comprising a control unit, wherein said antistatic coating material transports said tribo charges to said removing means.

15. An image forming device for an electrographical printer, having an electrode unit which comprises a screen or grid of electrodes with a plurality of apertures, wherein the apertures electrostatically control transmission of pigment particles to an information carrier, comprising:

antistatic coating material at surfaces of the device which are contacted by said pigment particles; and means for removing tribo friction charges which are produced between said pigment particles and said surfaces, said removing means comprising a high resistance resistor and a zener diode, wherein said antistatic coating material transports said tribo charges to said removing means.

* * * * *

UNITED STATES PATENT AND TRADEMARK OFFICE

CERTIFICATE OF CORRECTION

PATENT NO. : 5,307,092

DATED : April 26, 1994

INVENTOR(S) : Ove Larson

It is certified that error appears in the above-indentified patent and that said Letters Patent is hereby corrected as shown below:

Title page, item [30], Foreign Application Priority Data, change "8903617-8" to -- 8903167-8--.

Signed and Sealed this

Thirtieth Day of August, 1994

Attest:

BRUCE LEHMAN

Attesting Officer

Commissioner of Patents and Trademarks